Oct. 14, 1941.  A. BARNSTEINER ET AL  2,259,286
ELECTRIC HEATING UNIT
Filed Aug. 12, 1938

WITNESSES:

INVENTOR
Alfons Barnsteiner and
Joseph H. Reifenberg.
BY
ATTORNEY

Patented Oct. 14, 1941

2,259,286

UNITED STATES PATENT OFFICE 2,259,286

ELECTRIC HEATING UNIT

Alfons Barnsteiner and Joseph H. Reifenberg, Mansfield, Ohio, assignors to Westinghouse Electric & Manufacturing Company, East Pittsburgh, Pa., a corporation of Pennsylvania Application August 12, 1938, Serial No. 224,563

1 Claim. (Cl. 219—37)

Our invention relates to electric heating units, and more particularly to range surface units or cooking plates and the method of making the same.

It is an object of our invention to provide an electric heating unit formed from a spirally-wound elongated enclosed heating body with a complementarily-surfaced heat-conducting body positioned between the convolutions of the elongated heating body.

It is a further object of our invention to provide a method of producing an integral heating unit from a spirally-wound elongated enclosed heating body by positioning a complementarily-surfaced heat-conducting body between the convolutions of the heating unit, to provide material for the cooking surface, to increase the heat capacity of the unit, and to provide means for retaining the convolutions of the heating body in a given configuration.

Another object of our invention is to provide an electric heating unit having a complementarily-surfaced heat-conducting body of as low a thermal capacity as possible between the convolutions of a spirally-wound elongated enclosed-heating body.

A further object of our invention is to provide a rugged, efficient, inexpensive heating unit for a range and to provide a method of producing such unit from a coiled heating body.

Other objects of our invention will either be pointed out specifically in the course of the following description of a device embodying our invention, or will be apparent from such description.

In the accompanying drawing.

Figure 1:
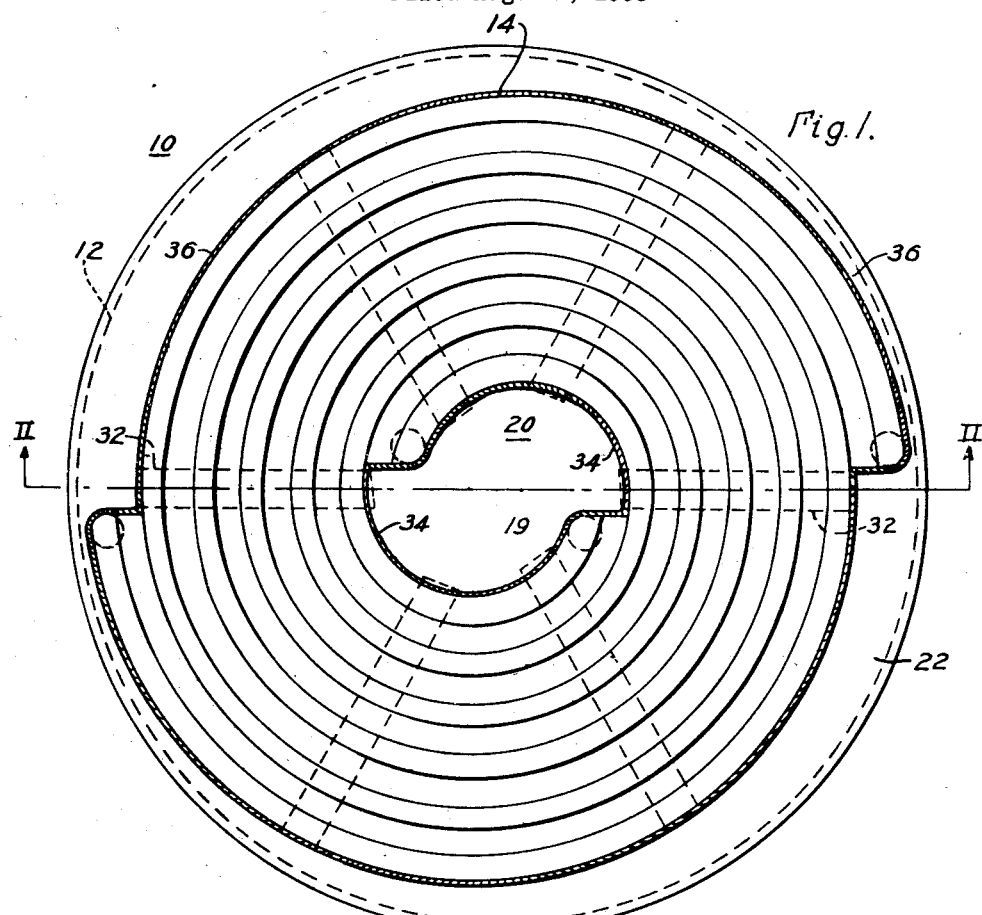
Figure 1 is a top plan view of a device embodying our invention.

Referring to the accompanying drawing, we show an electric heating unit or cooking plate 10 comprising a suitable, preferably cup-shaped, supporting structure 12, a heating plate 14 which includes an enclosed elongated heating element 16 and an intermediate complementarily-surfaced heat-conducting body 18, a centrally disposed disc or plate 20 and a peripheral supporting ring 22.

The heating plate 14 comprises, in this instance, the spirally-wound elongated enclosed heating body 16 with the complementarily-surfaced body 18 located intermediate the convolutions thereof. The heating body 16 preferably includes a resistance or heating coil or element 24 and suitable insulating material 26, such as magnesium oxide, positioned around the coil 24 within a sheath or casing 28. The complementarily-surfaced heat-conducting body 18 comprises a ribbon-like member or structure having substantially an hour-glass cross-sectional configuration to cooperate with and closely contact the substantially circular side walls of the heating body 16.

However, it is understood that the cross-sectional configuration of the ribbon-like member 18 may be of other shapes, depending upon, and being complementary to, the cross-sectional shape of the cooperating heating body 16. The ribbon-like member 18 is preferably formed from a material having a good heat-conducting quality, such as stainless steel or steel having a high temperature rust-resisting finish, such as chromium.

The heating plate 14 is formed by spirally winding the elongated enclosed heating body 16 about a common axis in such a manner that there will be a space between the succeeding or adjacent whorls. The shape of this space located intermediate the adjacent whorls is, of course, complementary to the cross-sectional configuration of the intermediate ribbon-like member 18, as hereinabove described. This ribbon-like member may then be positioned in the space adjacent the whorls of the heating body 16 or it may be wound about the common axis at the same time the heating body is wound in a spiral manner. It, therefore, follows that the intermediate complementarily-surfaced heat-conducting ribbon-like body 18, positioned intermediate the adjacent whorls of the spirally wound heating body 16 will conduct heat from the side portions of the heating body to the upper surface of such intermediate member, increasing the efficiency of the unit, as hereinafter described.

Figures 3, 4, 5:
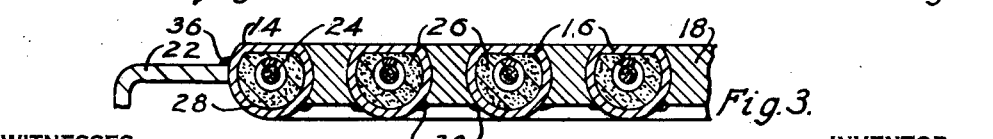
Fig. 3 is an enlarged view of a portion of Fig. 2.
Figs. 4 and 5 are fragmentary views of modified forms of a device embodying our invention.

If it be desired, the intermediate member 18 may be welded or brazed to the heating body 16 to rigidly attach it thereto, as shown at 30 in Figs. 3 and 4 so as to form a substantially integral member. However, if desired, radially disposed straps 32 may be positioned below the heating body 16 and may be rigidly attached thereto in any suitable manner to form the heating plate into an integral member. The intermediate member 18, due to the cooperative complementary surfaces between such member and the heating body 16, will be prevented from being displaced, that is, it will be retained in its proper position.

It, therefore, follows that due to the juxtapositioned complementary surfaces of the heating body 16 and intermediate member 18, should the radially disposed supporting member 32 be rigidly attached to the intermediate ribbon-like members 18, the heating body 16 operatively associated therewith will in a similar manner, be retained in its original position. Accordingly, the intermediate ribbon-like member 18, due to its cooperation with the heating body 16, provides means for retaining the convolutions thereof in a given configuration and increases the heat capacity of the surface unit due to the mass of such member. In addition, the intermediate member 18 provides material for producing a flat top cooking surface, as hereinafter described.

Figure 2:
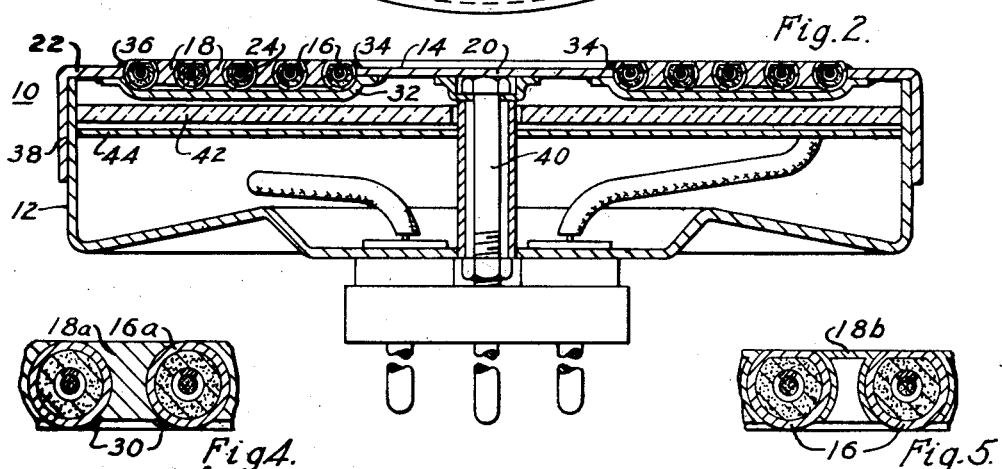
Fig. 2 is a sectional view taken along the line II—II of Fig. 1.

If it is desired to have a flat-surfaced cooking unit, the heating body 16 may have a flattened top surface substantially as shown in Figs. 2 and 3. The cooperating intermediate ribbon-like member 18 may also have a flat top surface and may be positioned substantially flush with the top surface of the heating body 16 to form a flat or continuous top cooking surface. However, if it be desired to have the heating body 16 of circular configuration, as shown by 16a in Fig. 4, the intermediate ribbon-like member 18a may be of a different configuration to conform with that of the heating body 16a. The top surface of the ribbon-like member 18a would then substantially alone form the top surface of the heating unit 10. With the unit formed in such a manner, substantially all the heat would have to be conducted to the top surface through the intermediate member 18a.

It, therefore, follows that the preferred form in which the heating body 16 has the upper surface thereof flattened, permitting the direct conduction of heat from the heating body to a cooking vessel located thereon, will be a more efficient operating unit, inasmuch as at least a portion of the heat from the heating body 16 will be conducted directly to a cooking vessel placed thereon.

It is to be understood that the top surface of the heating unit may, by arranging the heating body 16 and intermediate members 18 in any desired manner through the cooperation of securing straps 32, be of any desired configuration such as concave or convex, alternatively to the preferred flat surface shown in Figs. 3 and 4.

If desired, the heating plate 14 may be constructed so as to have as low a thermal capacity as possible by forming the intermediate complementary-surfaced heat-conducting member 18 from light weight sheet metal. The intermediate member will then be a hollow inverted substantially U-shaped member 18b, as shown in Fig. 5. The complementarily-surfaced sides of the intermediate member 18b will then cooperate with the various shaped heating bodies 16, as hereinabove described. In addition, the intermediate member 18b will cooperate with the heating bodies 16 to form a substantially flat-surfaced heating plate 14. However, the intermediate member 18b will, due to its light weight and extremely small mass, have a low thermal capacity and a quick heating rate, which, in turn, ensures a low thermal capacity and rapid heating rate for the heating plate 14, as a whole.

As the heating bodies 16 and intermediate ribbon-like members 18 are wound about a common axis, an irregularly shaped central gap or aperture 19 is left substantially in the center. A corresponding irregularly shaped disc 20 is positioned within the aperture 19 so as to completely fill it. The disc 20 is then rigidly attached to the heating body 16, preferably by welding thereto as shown at 34 in Figs. 1 and 2. A stamped sheet metal ring 22 is preferably rigidly attached to the outer edge of the heating body 16, preferably by welding thereto, as shown at 36 in Figs. 1, 2 and 3. However, it is to be understood that, if desired, the ring 22 need not be attached to the heating body 16.

The ring 22 has a depending portion 38 by means of which the heating plate 14, which may include the ring 22, heating body 16, intermediate member 18 and disc 20, may be rigidly attached to the supporting structure 12.

The depending portion 34 of the ring 20 may be rigidly attached to the casing 12 in any manner desired. However, it is preferred that the heating plate 14 be rigidly attached to the casing 12 by means of a suitable centrally-located bolt 40 substantially as shown in Fig. 2. As the heating plate 14 is rigidly attached to the casing 12, a certain amount of space is provided between the heating plate 14 and the casing 12. If desired, a ceramic insulating material 42 and a suitable reflector 44 may be positioned therein to adequately insulate the downward radiation and conduction of heat from the heating plate 14.

Various other modifications may be made in the device embodying our invention without departing from the spirit and scope thereof, and we desire, therefore, that only such limitations shall be placed thereon as are imposed by the prior art and the appended claim.

We claim as our invention:

An electric heating unit comprising, in combination, a spirally-wound elongated heating body having throughout its working length a flattened top located in substantially a single plane, the convolutions of said body forming a space therebetween, and an elongated three-sided sheet-metal body having two opposite sides complementarily surfaced with respect to said heating body disposed in said space to fit said heating body, the third side of said sheet-metal body being flat and disposed in substantially said plane.

ALFONS BARNSTEINER.
JOS. H. REIFENBERG.